United States Patent
Cho et al.

(10) Patent No.: US 10,796,853 B2
(45) Date of Patent: Oct. 6, 2020

(54) ELECTRONIC COMPONENT

(71) Applicant: SAMSUNG ELECTRO-MECHANICS CO., LTD., Suwon-si, Gyeonggi-do (KR)

(72) Inventors: Beom Joon Cho, Suwon-si (KR); Ki Young Kim, Suwon-si (KR); Jae Young Na, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 11 days.

(21) Appl. No.: 16/200,389

(22) Filed: Nov. 26, 2018

(65) Prior Publication Data

US 2020/0118752 A1    Apr. 16, 2020

(30) Foreign Application Priority Data

Oct. 11, 2018   (KR) ........................ 10-2018-0120865

(51) Int. Cl.
| | |
|---|---|
| *H01G 4/248* | (2006.01) |
| *H01G 2/04* | (2006.01) |
| *H01G 4/224* | (2006.01) |
| *H01G 4/232* | (2006.01) |
| *H01G 4/30* | (2006.01) |
| *H01G 2/02* | (2006.01) |

(Continued)

(52) U.S. Cl.
CPC .............. *H01G 4/224* (2013.01); *H01G 2/02* (2013.01); *H01G 2/04* (2013.01); *H01G 4/2325* (2013.01); *H01G 4/248* (2013.01); *H01G 4/30* (2013.01); *H01G 4/008* (2013.01); *H01G 4/1227* (2013.01); *H01G 4/1245* (2013.01)

(58) Field of Classification Search
None
See application file for complete search history.

(56) References Cited

U.S. PATENT DOCUMENTS

2004/0253474 A1 * 12/2004 Akamatsu ............ B23K 3/0638
                                                             428/615
2011/0141657 A1    6/2011 Jeon et al.
(Continued)

FOREIGN PATENT DOCUMENTS

| JP | 2004-273935 A | 9/2004 |
| JP | 2012-033660 A | 2/2012 |

(Continued)

OTHER PUBLICATIONS

Korean Office Action dated Sep. 20, 2019 issued in Korean Patent Application No. 10-2018-0120865 (with English translation).

*Primary Examiner* — Dion Ferguson
(74) *Attorney, Agent, or Firm* — Morgan, Lewis & Bockius LLP (57) ABSTRACT

An electronic component includes: a capacitor body; an external electrode disposed on an end of the capacitor body in a first direction and containing copper (Cu) as a main component; a metal frame electrically connected to the external electrode; and a bonding member disposed between the external electrode and the metal frame. The bonding member includes a tin (Sn)-based solder layer; a tin-copper based alloy solder layer disposed between the tin-based solder layer and the external electrode; and a tin-based alloy solder layer disposed between the tin-based solder layer and the metal frame.

18 Claims, 7 Drawing Sheets

(51) Int. Cl.
*H01G 4/12* (2006.01)
*H01G 4/008* (2006.01)

(56) References Cited

U.S. PATENT DOCUMENTS

| | | | | |
|---|---|---|---|---|
| 2012/0236462 A1* | 9/2012 | Haruki | ............... | H01G 4/005 |
| | | | | 361/306.1 |
| 2013/0155573 A1* | 6/2013 | Kim | ............... | H01G 13/00 |
| | | | | 361/305 |
| 2013/0279071 A1* | 10/2013 | Okamoto | ............... | H01G 4/30 |
| | | | | 361/301.4 |
| 2013/0279072 A1* | 10/2013 | Okamoto | ............... | H01G 4/30 |
| | | | | 361/301.4 |
| 2015/0054388 A1* | 2/2015 | Itagaki | ............... | H01C 7/008 |
| | | | | 310/364 |
| 2016/0086730 A1* | 3/2016 | Park | ............... | H01G 4/30 |
| | | | | 174/260 |

FOREIGN PATENT DOCUMENTS

| JP | 2015-062215 A | 4/2015 |
|---|---|---|
| KR | 10-2011-0067509 A | 6/2011 |
| KR | 10-2012-0106599 A | 9/2012 |
| KR | 10-2013-0070097 A | 6/2013 |

\* cited by examiner

ELECTRONIC COMPONENT

CROSS-REFERENCE TO RELATED APPLICATION(S)

This application claims the benefit of priority to Korean Patent Application No. 10-2018-0120865 filed on Oct. 11, 2018 in the Korean Intellectual Property Office, the disclosure of which is incorporated herein by reference in its entirety.

TECHNICAL FIELD

The present disclosure relates to an electronic component.

BACKGROUND

A multilayer ceramic capacitor (MLCC) has been used in various electronic devices since it is small in size and capable of implementing high capacitance.

In recent years, eco-friendly vehicles and electric vehicles have rapidly emerged, and thus, electric drive systems have been increasingly used in vehicles. Accordingly, demand for an MLCC needed in a vehicle has also increased.

To be used as an automotive component, the MLCC is required to have high levels of thermal, electrical and mechanical reliability. Therefore, the MLCC has been increasingly required to have a more sophisticated degree of performance.

Therefore, there is required an MLCC having a structure in which high durability is provided against vibrations and deformation.

In order to improve the durability against such vibrations and deformation, there is provided an electronic component having a structure in which the MLCC is mounted to be spaced apart from a board by means of metal frames.

However, when the electronic component is mounted on the board, portions for bonding external electrodes of the MLCC and the metal frames to each other may deteriorate due to thermal and mechanical impacts, such that the MLCC may be separated from the metal frames.

SUMMARY

An aspect of the present disclosure may provide an electronic component in which durability of a multilayer ceramic capacitor (MLCC) is enhanced and bonding strength between the MLCC and metal frames is also improved.

According to an aspect of the present disclosure, an electronic component includes: a capacitor body; an external electrode disposed on an end of the capacitor body in a first direction and containing copper (Cu) as a main component; a metal frame electrically connected to the external electrode; and a bonding member disposed between the external electrode and the metal frame. The bonding member includes a tin (Sn)-based solder layer; a tin-copper based alloy solder layer disposed between the tin-based solder layer and the external electrode; and a tin-based alloy solder layer disposed between the tin-based solder layer and the metal frame.

The tin-based solder layer may further contain copper.

The tin-based solder layer may further contain silver (Ag).

The metal frame may include nickel (Ni), iron (Fe), copper, aluminum (Al), chrome (Cr), silver or an alloy containing two or more thereof.

The electronic component may further include a plating layer containing at least one of nickel, tin, palladium (Pd), silver, and gold (Au) and disposed on surface of the external electrode so that at least a portion of each plating layer is opened.

The capacitor body may include: dielectric layers; and first and second internal electrodes alternately arranged with each of the dielectric layers interposed therebetween. One end portions of the first and second internal electrodes are exposed respectively in a first direction through opposite surfaces of the capacitor body in order to be connected to the first and second external electrodes, respectively.

The external electrode may include: a head portion disposed on an end surface of the capacitor body in the first direction; and band portions extending respectively from the head portions to portions of first and second surfaces of the capacitor body opposing each other and to portions of third and fourth surfaces of the capacitor body opposing each other.

The metal frame may include: a support portion bonded to the head portion of the external electrode; and a mount portion extending from an end portion of the support portion in the first direction and disposed to be spaced apart from the capacitor body and the external electrode.

Areas of the tin-based solder layer and the tin-copper based alloy solder layer may each be smaller than the area of the head portion.

The external electrode may include first and second external electrodes disposed on opposite ends of the capacitor body in the first direction, the metal frame may include first and second metal frames electrically connected to the first and second external electrodes, respectively, and the bonding member may include a first bonding member disposed between the first external electrode and the first metal frame, and a second bonding member disposed between the second external electrode and the second metal frame.

A portion of each plating layer may be opened, and the tin-copper based alloy solder layer may be disposed in the opened portion of each plating layer.

According to another aspect of the present disclosure, an electronic component includes: a capacitor body; an external electrode disposed on an end of the capacitor body in a first direction and containing copper (Cu) as a main component; a metal frame electrically connected to the external electrode; and a bonding member disposed between the external electrode and the metal frame. The bonding member includes a tin (Sn)-based solder layer and a tin-copper based alloy solder layer; and the tin-based solder layer is disposed on both sides of the tin-copper based alloy solder layer in a second direction perpendicular to the first direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Directions will be defined in order to clearly describe exemplary embodiments in the present disclosure. X, Y and Z in the drawings refer to a length direction, a width direction, and a thickness direction of a multilayer ceramic capacitor (hereinafter, MLCC) and an electronic component, respectively.

Here, the Z direction refers to a stack direction in which dielectric layers are stacked.

Figure 1:
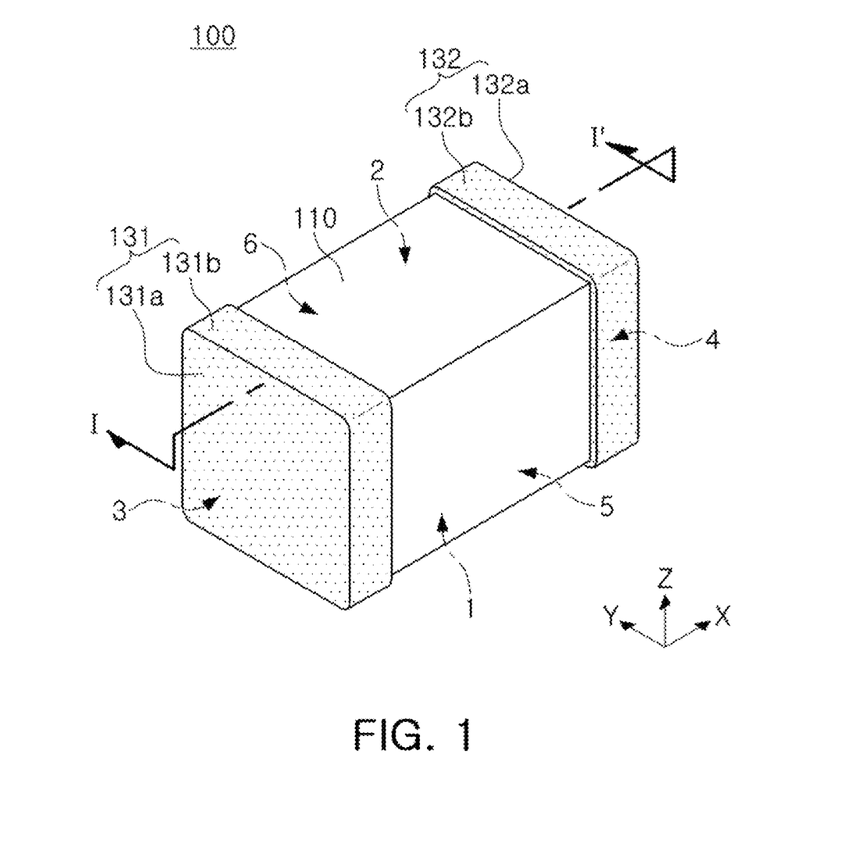
FIG. 1 is a perspective view schematically illustrating a multilayer ceramic capacitor (hereinafter, MLCC) used in an exemplary embodiment in the present disclosure.
Figure 2A:
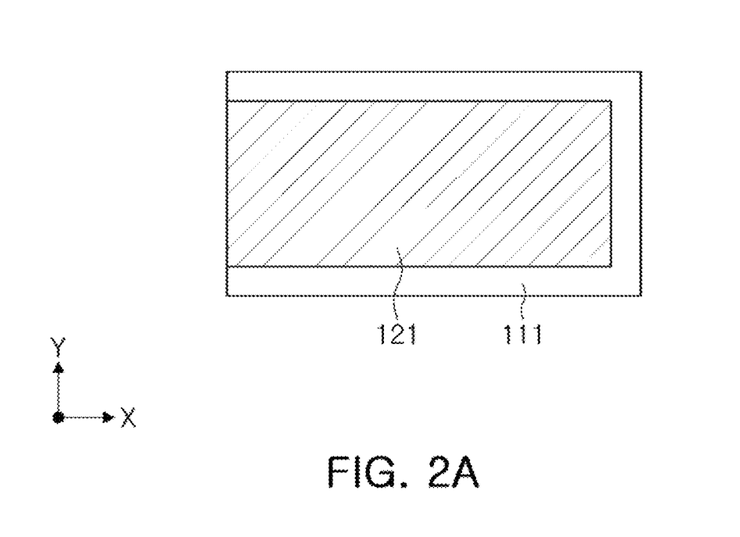
FIGS. 2A and 2B are plan views illustrating first and second internal electrodes used in the MLCC of FIG. 1, respectively.
Figure 2B:
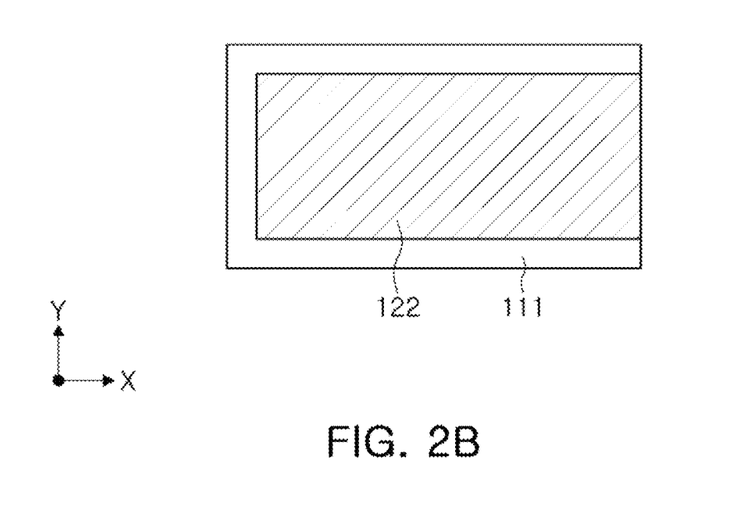

FIG. 1 is a perspective view schematically illustrating the MLCC used in an exemplary embodiment in the present disclosure; FIGS. 2A and 2B are plan views illustrating first and second internal electrodes used in the MLCC of FIG. 1, respectively; and FIG. 3 is a cross-sectional view taken along a line I-I' of FIG. 1.

Figure 3:
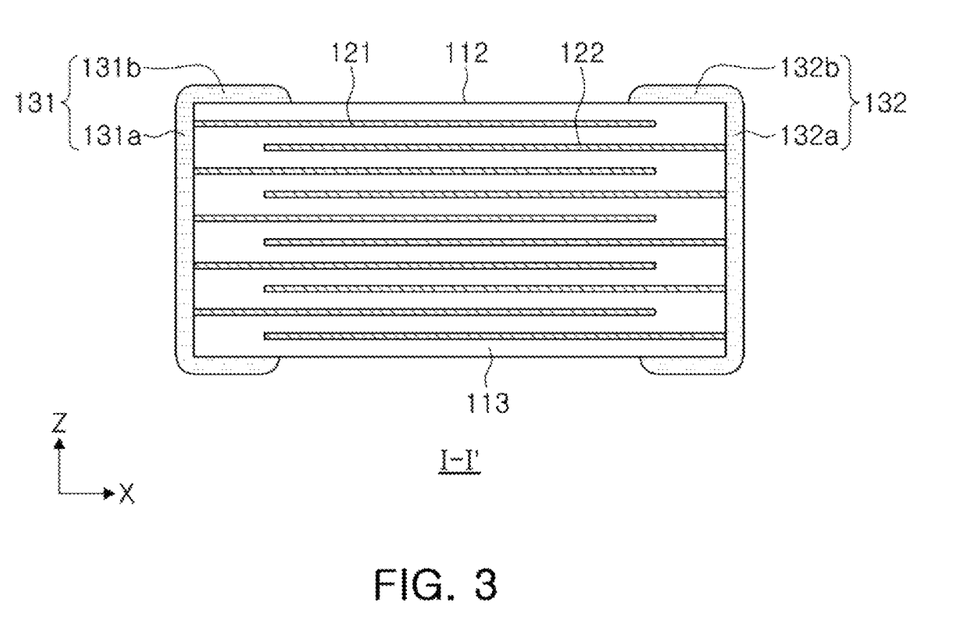
FIG. 3 is a cross-sectional view taken along a line I-I' of FIG. 1.

Referring to FIGS. 1 through 3, described first is a structure of the MLCC used in an electronic component according to the present exemplary embodiment.

Referring to FIGS. 1 through 3, the MLCC 100 according to the present exemplary embodiment may include a capacitor body 110 and first and second external electrodes 131 and 132 formed at opposite ends of the capacitor body 110 in the X direction, which is referred to as a first direction of the capacitor body 110, respectively.

The capacitor body 110 may be formed by stacking and then sintering a plurality of dielectric layers 111 in the Z direction, and adjacent dielectric layers 111 of the capacitor body 110 may be integrated with each other so that boundaries therebetween are not readily apparent without using a scanning electron microscope (SEM).

Further, the capacitor body 110 may include the plurality of dielectric layers 111, and first and second internal electrodes 121 and 122 may be applied with different polarities and alternately arranged in the Z direction with each of the dielectric layers 111 interposed therebetween.

Furthermore, the capacitor body 110 may include an active region contributing to forming a capacitance of the MLCC; and cover regions 112 and 113 provided as margin portions on upper and lower surfaces of the active region in the Z direction, respectively.

A shape of the capacitor body 110 is not particularly limited, but may be a hexahedral shape, and the capacitor body 110 may have: first and second surfaces 1 and 2 opposing each other in the Z direction; third and fourth surfaces 3 and 4 connected to the first and second surfaces 1 and 2 and opposing each other in the X direction; and fifth and sixth surfaces 5 and 6 connected to the first and second surfaces 1 and 2, connected to the third and fourth surfaces 3 and 4, and opposing each other.

Each of the dielectric layers 111 may contain ceramic powder particles such as $BaTiO_3$-based ceramic powder particles, or the like.

An example of the $BaTiO_3$-based ceramic powder particles may contain $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like, is partially solid-dissolved in $BaTiO_3$. However, the $BaTiO_3$-based ceramic powder is not limited thereto.

In addition, each of the dielectric layers 111 may further contain a ceramic additive, an organic solvent, a plasticizer, a binder, a dispersant, and the like, in addition to the ceramic powder particles.

The ceramic additive may contain, for example, a transition metal oxide or a transition metal carbide, a rare earth element, magnesium (Mg), aluminum (Al), or the like.

The first and second internal electrodes 121 and 122 having different polarities may be formed on the dielectric layers 111 and be stacked in the Z direction, and alternately arranged in the capacitor body 110 to oppose each other in the Z direction with each of the dielectric layers 111 interposed therebetween.

In this case, the first and second internal electrodes 121 and 122 may be electrically insulated from each other by each of the dielectric layers 111 disposed therebetween.

Meanwhile, a structure in which the internal electrodes are stacked in the Z direction is illustrated and described in the present disclosure. However, the present disclosure is not limited thereto, and may also be used in a structure in which the internal electrodes are stacked in the Y direction, when necessary.

One end portions of the first and second internal electrodes 121 and 122 may be exposed through the third and fourth surfaces 3 and 4 of the capacitor body 110, respectively.

The one end portions of the first and second internal electrodes 121 and 122 alternately exposed through the third and fourth surfaces 3 and 4 of the capacitor body 110, respectively, may be electrically connected to the first and second external electrodes 131 and 132, which will be described below, disposed on opposite ends of the capacitor body 110 in the X direction, respectively.

According to the configuration as described above, when predetermined voltages are used in the first and second external electrodes 131 and 132, electric charges may be accumulated between the first and second internal electrodes 121 and 122.

In this case, a capacitance of the MLCC 100 may be in proportion to area of the first and second internal electrodes 121 and 122 overlapping each other in the Z direction in the active region.

In addition, a material of the first and second internal electrodes 121 and 122 is not particularly limited, and may be a conductive paste formed of one or more of : for example, a noble metal material such as platinum (Pt), palladium (Pd), a palladium-silver (Pd—Ag) alloy, or the like; nickel (Ni); and copper (Cu).

In this case, a method of printing the conductive paste may be a screen printing method, a gravure printing method, or the like, but is not limited thereto.

The first and second external electrodes 131 and 132 may be provided with voltages having different polarities, respectively; may be disposed at the opposite ends of the capacitor body 110 in the X direction, respectively; and may be in contact with and electrically connected to the exposed end portions of the first and second internal electrodes 121 and 122, respectively.

The first external electrode 131 may include a first head portion 131a and a first band portion 131b.

The first head portion 131a may be disposed on the third surface 3 of the capacitor body 110; and may be in contact with the end portions of the first internal electrodes 121, which are externally exposed through the third surface 3 of the capacitor body 110, to serve to physically and electrically connect the first internal electrodes 121 and the first external electrode 131 to each other.

The first band portion 131b may extend from the first head portion 131a to portions of the first, second, fifth, and sixth surfaces 1, 2, 5, and 6 of the capacitor body 110 in order to improve adhesion strength, or the like.

The second external electrode 132 may include a second head portion 132a and a second band portion 132b.

The second head portion 132a may be disposed on the fourth surface 4 of the capacitor body 110; and may be in contact with the end portions of the second internal electrodes 122, which are externally exposed through the fourth surface 4 of the capacitor body 110, to serve to physically and electrically connect the second internal electrodes 122 and the second external electrode 132 to each other.

The second band portion 132b may extend from the second head portion 132a to portions of the first, second, fifth, and sixth surfaces 1, 2, 5, and 6 of the capacitor body 110 in order to improve adhesion strength, or the like.

The first and second external electrodes 131 and 132 may be formed containing copper as a main component so that tin-copper (Sn—Cu) based alloy solder layers described below may be formed respectively between the first external electrodes 131 and 132, and first and second tin-based solder layers of first and second bonding members.

Further, the first and second external electrodes 131 and 132 may further contain a glass component or a small amount of other metal components to improve bonding with the capacitor body 110 and electrical properties thereof.

In addition, plating layers (not illustrated) may be further formed on surfaces of the first and second external electrodes 131 and 132, respectively.

The plating layers may contain at least one of nickel (Ni), tin, palladium (Pd), silver (Ag), and gold (Au), and may be respectively formed on surfaces of the first and second external electrodes 131 and 132 so that a portion of each plating layer is opened to form the tin-copper based alloy solder layer. Hence, the tin-copper based alloy solder layer is disposed in the opened portion of each plating layer.

Figure 4:
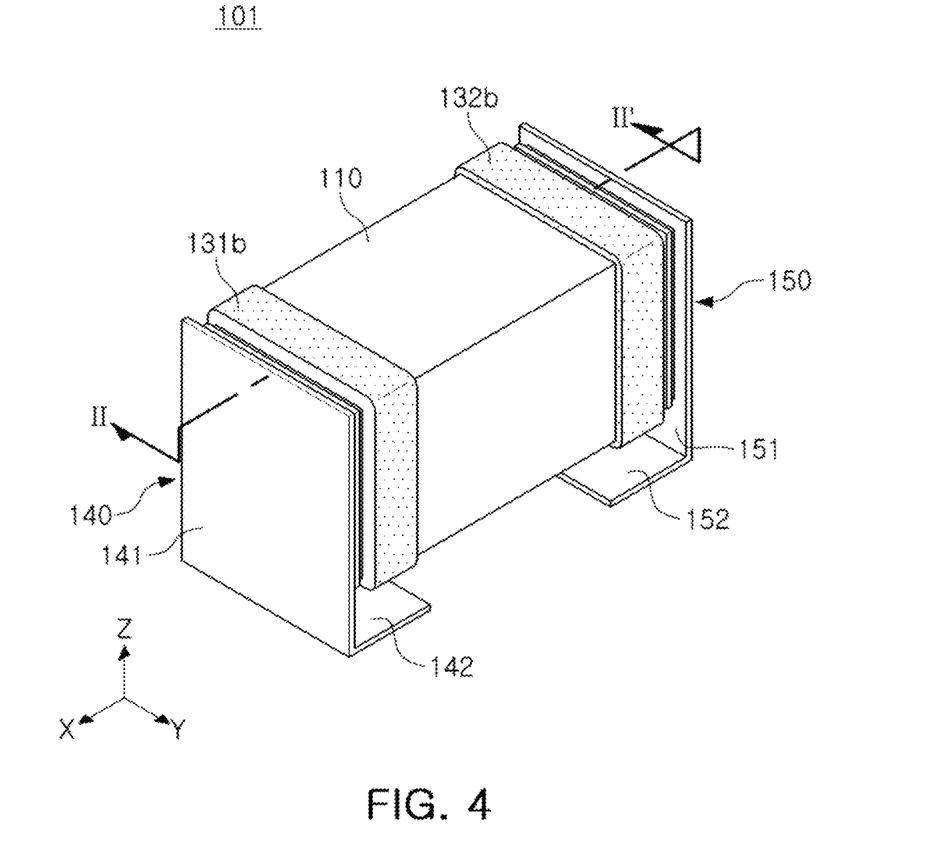
FIG. 4 is a perspective view schematically illustrating metal frames bonded to the MLCC of FIG. 1.
Figure 5:
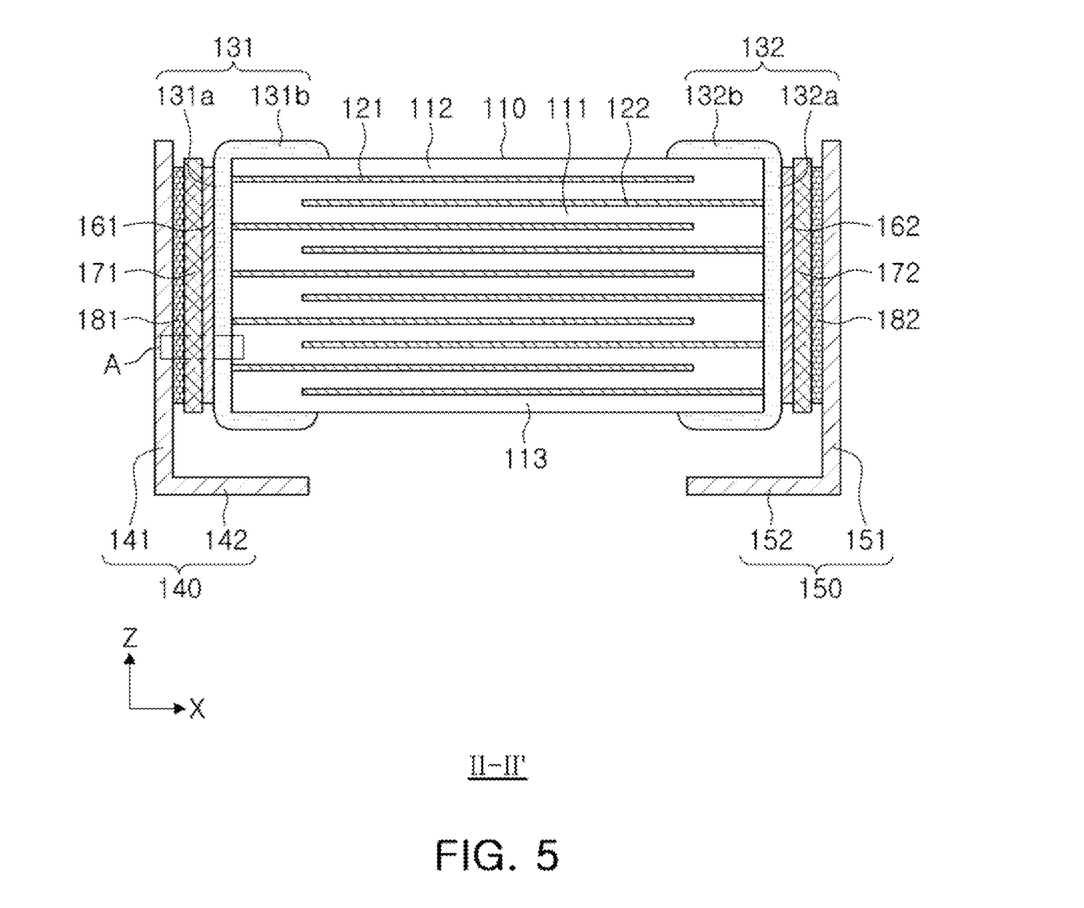
FIG. 5 is a cross-sectional view taken along a line II-II' of FIG. 4.
Figure 6:
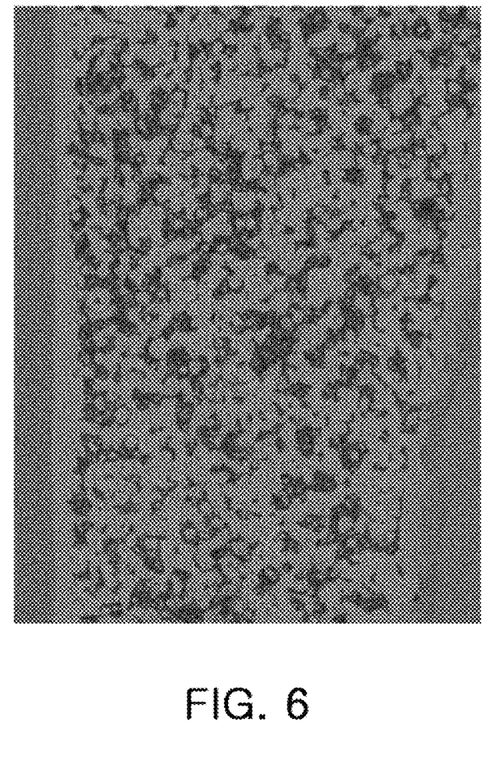
FIG. 6 is an enlarged photograph of a portion A in FIG. 5.

FIG. 4 is a perspective view schematically illustrating metal frames bonded to the MLCC of FIG. 1, FIG. 5 is a cross-sectional view taken along a line II-II' of FIG. 4, and FIG. 6 is an enlarged photograph of a portion A in FIG. 5.

Referring to FIGS. 4 through 6, the electronic component 101 according to the present exemplary embodiment may include the MLCC 100, first and second metal frames 140 and 150 respectively connected to the first and second external electrodes 131 and 132 of the MLCC 100, and first and second bonding members.

The first metal frame 140 may include a first support portion 141 and a first mount portion 142.

The first support portion 141 may be formed perpendicular to a mount surface, and bonded to the first head portion 131a of the first external electrode 131. In this manner, the first support portion 141 may be physically and electrically connected to the first head portion 131a of the first external electrode 131.

The first mount portion 142 may be formed horizontal to the mount surface by extending in the X direction, which is the first direction, from a lower end of the first support portion 141; and serve as a connection terminal when the electronic component is mounted on a board.

In addition, the first mount portion 142 may be disposed spaced apart from a lower surface of the MLCC 100 in the Z direction.

The second metal frame 150 may include a second support portion 151 and a second mount portion 152.

The second support portion 151 may be formed perpendicular to the mount surface, and bonded to the second head portion 132a of the second external electrode 132. In this manner, the second support portion 151 may be connected to the second head portion 132a of the second external electrode 132 physically and electrically.

The second mount portion 152 may be formed horizontal to the mount surface by extending in the X direction, which is the first direction, from a lower end of the second support portion 151; and serve as a connection terminal when the electronic component is mounted on the board.

The second mount portion 152 may be disposed to be spaced apart from the lower surface of the MLCC 100 in the Z direction.

The first and second metal frames 140 and 150 may be formed of nickel (Ni), iron (Fe), copper (Cr), aluminum (Al), chromium (Cr), silver or an alloy containing said metals. There may thus be formed tin-based alloy solder layers to be described below, which contain tin together with metal components of the metal frames, between said metal frames and the first and second tin-based solder layers.

The first bonding member may be disposed between the first head portion 131a of the first external electrode 131 and the first support portion 141 of the first metal frame 140.

The first bonding member may include a first tin-based solder layer 171, a first tin-copper based alloy solder layer 161, and a first tin-based alloy solder layer 181.

The first tin-based solder layer 171 may contain tin as a main component, and may further contain copper. The first tin-based solder layer 171 may further contain silver.

Area of the first tin-based solder layer 171 may be smaller than the area of the first head portion 131a.

The first tin-copper based alloy solder layer 161 may be formed between the first tin-based solder layer 171 and the first head portion 131a. The first tin-copper based alloy solder layer 161 may be formed of an alloy containing tin and copper due to a tin component contained in the first tin-based solder layer 171 and a copper component contained in the first head portion 131a.

Area of the first tin-copper based alloy solder layer 161, which is a first inner alloy layer, may be smaller than the area of the first head portion 131a.

The first tin-based alloy solder layer 181 may be formed between the first tin-based solder layer 171 and the first support portion 141. The first tin-based alloy solder layer 181 may thus be formed of a tin component contained in the first tin-based solder layer 171 and any metal component contained in the first support portion 141 of the first metal frame 140.

For example, when the first metal frame 140 is formed of copper, the first tin-based alloy solder layer 181 may be an alloy layer of tin and copper.

The second bonding member may be disposed between the second head portion 132a of the second external electrode 132 and the second support portion 151 of the second metal frame 150.

The second bonding member may include a second tin-based solder layer 172, a first tin-copper based alloy solder layer 162, and a first tin-based alloy solder layer 182.

The second tin-based solder layer 172 may contain tin as a main component and may further contain copper. The second tin-based solder layer 172 may further contain silver.

Area of the second tin-based solder layer 172 may be smaller than the area of the second head portion 132a.

The second tin-copper based solder layer 162 may be formed between the second tin-based solder layer 172 and the second head portion 132a. The second tin-copper based solder layer 162 may be formed of an alloy containing tin and copper due to a tin component contained in the second tin-based solder layer 172 and a copper component contained in the second head portion 132a.

Area of the second tin-copper based alloy solder layer 162, which is a second inner alloy layer, may be smaller than the area of the second head portion 132a.

The second tin-based alloy solder layer 182 may be formed between the second tin-based solder layer 172 and the second support 151. The second tin-based alloy solder layer 182 may thus be formed of a tin component contained in the second tin-based solder layer 172 and any metal component contained in the second support portion 151 of the second metal frame 150.

For example, when the second metal frame 150 is formed of copper, the second tin-based alloy solder layer 182 may be an alloy layer of tin and copper.

In an MLCC having conventional metal frames, the MLCC and the metal frames are bonded to each other by solders, respectively. In a reflow process for mounting an electronic component on a board, the solders may melt and cause a problem in which the MLCC is apt to drop out of or tilt from the metal frames.

In addition, the interfaces between the metal frame and the solder, and the interfaces between the external electrode and the solder are bonded using different materials. Therefore, when exposed to a thermal shock environment such as a temperature cycle or the like for a long time, stresses are accumulated due to different thermal expansion coefficients of the above respective materials, and the above interfaces may thus be apt to deteriorate and separate from each other.

In order to solve the problem, a nickel-tin alloy layer having a high melting point may be formed on a portion of a bonding interface of the metal frame. In this manner, bonding deterioration by the reflow may be reduced.

However, when nickel is exposed on a surface of the external electrode, the electrical properties may be deteriorated by oxidation of nickel.

According to the present exemplary embodiment, the external electrodes may be formed of copper, and the solder layers may be formed of the tin-based solder layers to bond the external electrodes and the metal frames to each other. Each alloy layer having a high melting point may thus be formed at least in a portion between the external electrode and the tin-based solder layer, such that the external electrodes and the metal frames are bonded together. In this manner, the MLCC may be prevented from dropping out of or tilting from the metal frames even when the solders melt in a conventional reflow process.

Further, since portions of the surfaces of the external electrodes not plated with nickel or the like, but formed of copper may be exposed intactly to the outside, there may be reduced deterioration of electrical properties caused by high oxidation action of a nickel component in a conventional nickel plating process.

Hereinafter, in order to confirm the improvement effects of the high-temperature bonding strength in the present exemplary embodiment, there is evaluated the high-temperature bonding strength depending on changes in areas of the tin-copper (Sn—Cu) alloy layers which are formed between the external electrodes and the metal frames.

Figure 7:
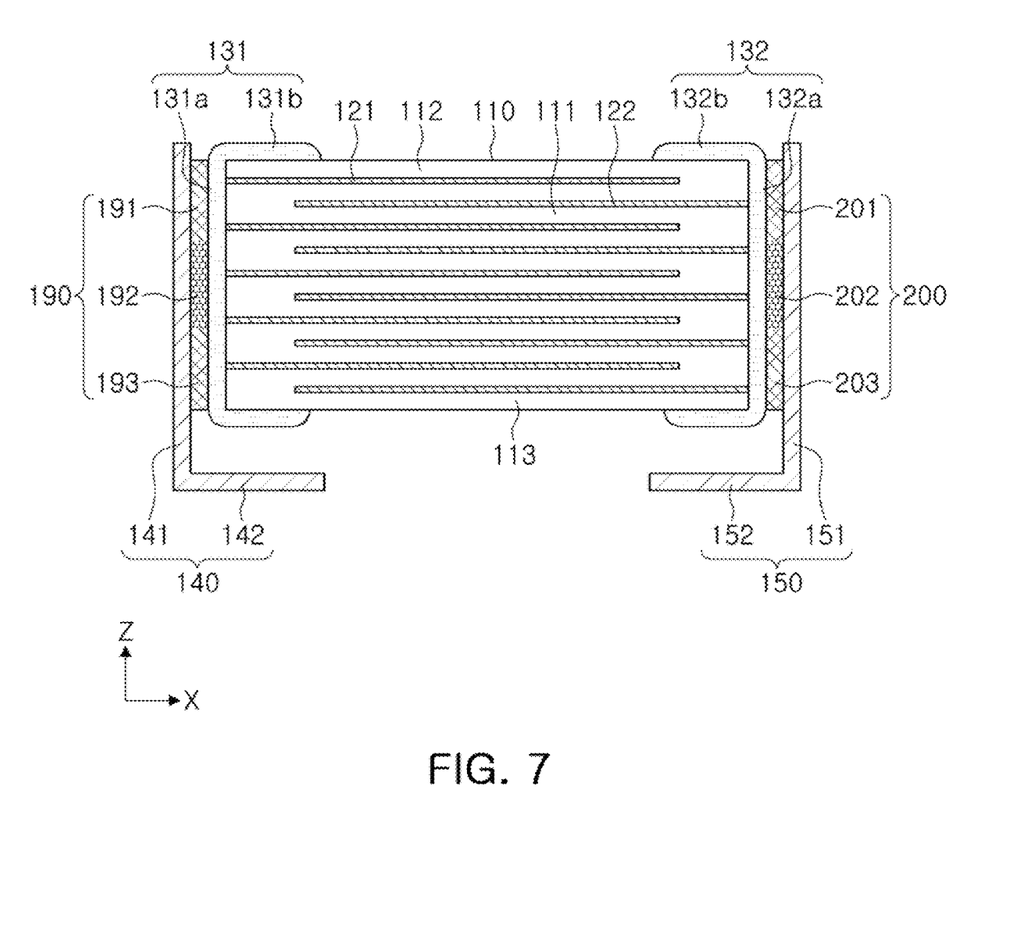
FIG. 7 is a cross-sectional view of an electronic component used in an experimental example to confirm improvement in high-temperature bonding strength of a tin-copper (Sn—Cu) based alloy layer.

Referring to FIG. 7, solders 190 and 200 may be formed between: the first and second head portions 131a and 132a of the first and second external electrodes 131 and 132 and the first and second support portions 141 and 151 of the first and second metal frames 140 and 150, respectively. Intermediate solders in the Z direction may be formed of tin-copper (Sn—Cu) based solders 192 and 202, respectively; and upper and lower solders maybe formed of tin-antimony (Sn—Sb) based solders 191 and 193, and 201 and 203, respectively.

In the experiment, the first and second support portions 141 and 151 of the first and second metal frames 140 and 150 may be bonded respectively to the first and second external electrodes 131 and 132, which are formed on opposite ends of the MLCC, by means of the solders 190 and 200. Here, solders 190 and 200 may be formed of the tin-copper based solders 192 and 202, and the tin-antimony based solders 191 and 193, and 201 and 203, respectively.

In this case, 'a' may refer to areas in which the tin-copper solders 192 and 202 are used in the first and second support portions 141 and 151 of the first and second metal frames 140 and 150, respectively; and 'b' may refer to areas in which the tin-antimony based solders 191 and 193, and 201 and 203 are used in the support portions 141 and 151 thereof, respectively.

Here, the tin-copper alloy layers (not illustrated) may be measured when the interfaces are exposed by cross-section polishing. According to the experiment, the tin-copper alloy layers may be formed only at portions to which the tin-copper based solders 192 and 202 are applied. As a result, there may be calculated a/(a+b) as areas of the tin-copper alloy layers which are formed on the interfaces between the head portions 131a and 132a of the first and second external electrodes 131 and 132 and the solders 190 and 200, respectively.

In the experiment, the high-temperature bonding strength is evaluated depending on whether or not the MLCC 100 drops out of the metal frames by: bonding the capacitor body 110 to the first and second metal frames 140 and 150 using the solders 190 and 200; installing an object (not illustrated) having a load of 250 mg on the second surface 2 of the capacitor body 110 of the MLCC 100; and then performing a reflow process at 270° C. three times. Here, the number of samples is set to be 5 per each condition.

TABLE 1

| a/(a + b) | 0 | 0.05 | 0.1 | 0.3 | 0.5 |
|---|---|---|---|---|---|
| Dropout (EA) | 2 | 0 | 0 | 0 | 0 |

Referring to Table 1, when a/(a+b)=0, i.e. when the tin-copper based solders are not applied, the tin-copper alloy layer having a high melting point is not formed between the first and second head portions 131a and 132a of the first and second external electrodes 131 and 132, and the first and second support portions 141 and 151 of the first and second metal frames 140 and 150. In this case, the MLCC 100 drops out of the metal frames by the load having a high temperature.

In contrast, when a/(a+b)>0, i.e. when the tin-copper based solders 192 and 202 are used in the first and second support portions 141 and 151 of the first and second metal frames 140 and 150,respectively, the tin-copper alloy layers are formed at least partially between the first and second head portions 131a and 132a of the first and second external electrodes 131 and 132, and the first and second support portions 141 and 151 of the first and second metal frames 140 and 150, respectively. In this case, the MLCC 100 does not drop out of the metal frames by the load having a high temperature.

Accordingly, when the external electrodes are formed to contain copper and the bonding members are formed to include the tin-based solder layers as in the present disclosure, the tin-copper based alloy solder layers may be formed at the interfaces between the tin-based solder layers and the external electrodes, respectively. In this manner, the bonding strength between the MLCC and the metal frames may be improved.

As set forth above, according to an exemplary embodiment in the present disclosure, the bonding strength between the external electrodes and the metal frames may be improved, while enhancing durability of the MLCC.

While exemplary embodiments have been shown and described above, it will be apparent to those skilled in the art that modifications and variations could be made without departing from the scope of the present invention as defined by the appended claims.

What is claimed is:

1. An electronic component comprising:
   a capacitor body;
   an external electrode disposed on an end of the capacitor body in a first direction and containing copper (Cu) as a main component;
   a metal frame connected to the external electrode; and
   a bonding member disposed between the external electrode and the metal frame,
   wherein the bonding member includes a tin (Sn)-based solder layer;
   a tin-copper based alloy solder layer disposed between the tin-based solder layer and the external electrode; and
   a tin-based alloy solder layer disposed between the tin-based solder layer and the metal frame.

2. The electronic component of claim 1, wherein the tin-based solder layer contains copper (Cu).

3. The electronic component of claim 2, wherein the tin-based solder layer further contains silver (Ag).

4. The electronic component of claim 1, wherein the metal frame includes at least one selected from the group of nickel (Ni), iron (Fe), copper (Cu), aluminum (Al), chrome (Cr), silver (Ag) and an alloy containing two or more thereof.

5. The electronic component of claim 1, further comprising a plating layer containing at least one selected from the group of nickel (Ni), tin (Sn), palladium (Pd), silver (Ag) and gold (Au) disposed on a surface of the external electrode.

6. The electronic component of claim 1, wherein the capacitor body includes:
   dielectric layers; and
   first and second internal electrodes alternately arranged with each of the dielectric layers interposed therebetween;
   the external electrode includes first and second external electrodes disposed on opposite ends of the capacitor body, and
   one end portions of the first and second internal electrodes are exposed respectively in the first direction through opposite surfaces of the capacitor body to be electrically connected to the first and second external electrodes, respectively.

7. The electronic component of claim 1, wherein the external electrode includes:
   a head portion disposed on the end surface of the capacitor body in the first direction; and
   band portions extending respectively from the head portions to portions of first and second surfaces of the capacitor body opposing each other and to portions of third and fourth surfaces of the capacitor body opposing each other.

8. The electronic component of claim 7, wherein the metal frame includes:
   a support portion bonded to the head portion of the external electrode; and
   amount portion extending respectively from an end portion of the support portion in the first direction and disposed to be spaced apart from the capacitor body and the external electrode.

9. The electronic component of claim 7, wherein areas of the tin-based solder layer and the tin-copper based alloy solder layer are each smaller than the area of the head portion.

10. The electronic component of claim 1, wherein the external electrode includes first and second external electrodes disposed on opposite ends of the capacitor body in the first direction, the metal frame includes first and second metal frames electrically connected to the first and second external electrodes, respectively, and the bonding member includes a first bonding member disposed between the first external electrode and the first metal frame, and a second bonding member disposed between the second external electrode and the second metal frame.

11. The electronic component of claim 5, wherein a portion of each plating layer is opened, and the tin-copper based alloy solder layer is disposed in the opened portion of each plating layer.

12. An electronic component comprising:
   a capacitor body;
   an external electrode disposed on an end of the capacitor body in a first direction and containing copper (Cu) as a main component;
   a metal frame electrically connected to the external electrode; and
   a bonding member disposed between the external electrode and the metal frame,
   wherein the bonding member includes a tin (Sn)-based solder layer and a tin-copper based alloy solder layer; and
   the tin-based solder layer is disposed on both sides of the tin-copper based alloy solder layer in a second direction perpendicular to the first direction.

13. The electronic component of claim 12, wherein the tin-based solder layer further contains antimony (Sb).

14. The electronic component of claim 12, wherein the tin-based solder layer contains copper (Cu).

15. The electronic component of claim 14, wherein the tin-based solder layer further contains silver (Ag).

16. The electronic component of claim 14, wherein the metal frame includes at least one selected from the group of nickel (Ni), iron (Fe), copper (Cu), aluminum (Al), chrome (Cr), silver (Ag) and an alloy containing two or more thereof.

17. The electronic component of claim 14, further comprising a plating layer containing at least one selected from the group of nickel (Ni), tin (Sn), palladium (Pd), silver (Ag) and gold (Au) disposed on a surface of the external electrode.

18. The electronic component of claim 14, wherein the capacitor body includes:
   dielectric layers; and first and second internal electrodes alternately arranged with each of the dielectric layers interposed therebetween;

the external electrode includes first and second external electrodes disposed on opposite ends of the capacitor body, and one end portions of the first and second internal electrodes are exposed respectively in the first direction through opposite surfaces of the capacitor body to be electrically connected to the first and second external electrodes, respectively.

* * * * *